May 9, 1967  T. H. HOULE  3,319,255
SIGNAL TRANSMITTING CIRCUIT FOR REMOTE SENSING OF PETROLEUM FLOW
Filed Dec. 28, 1964
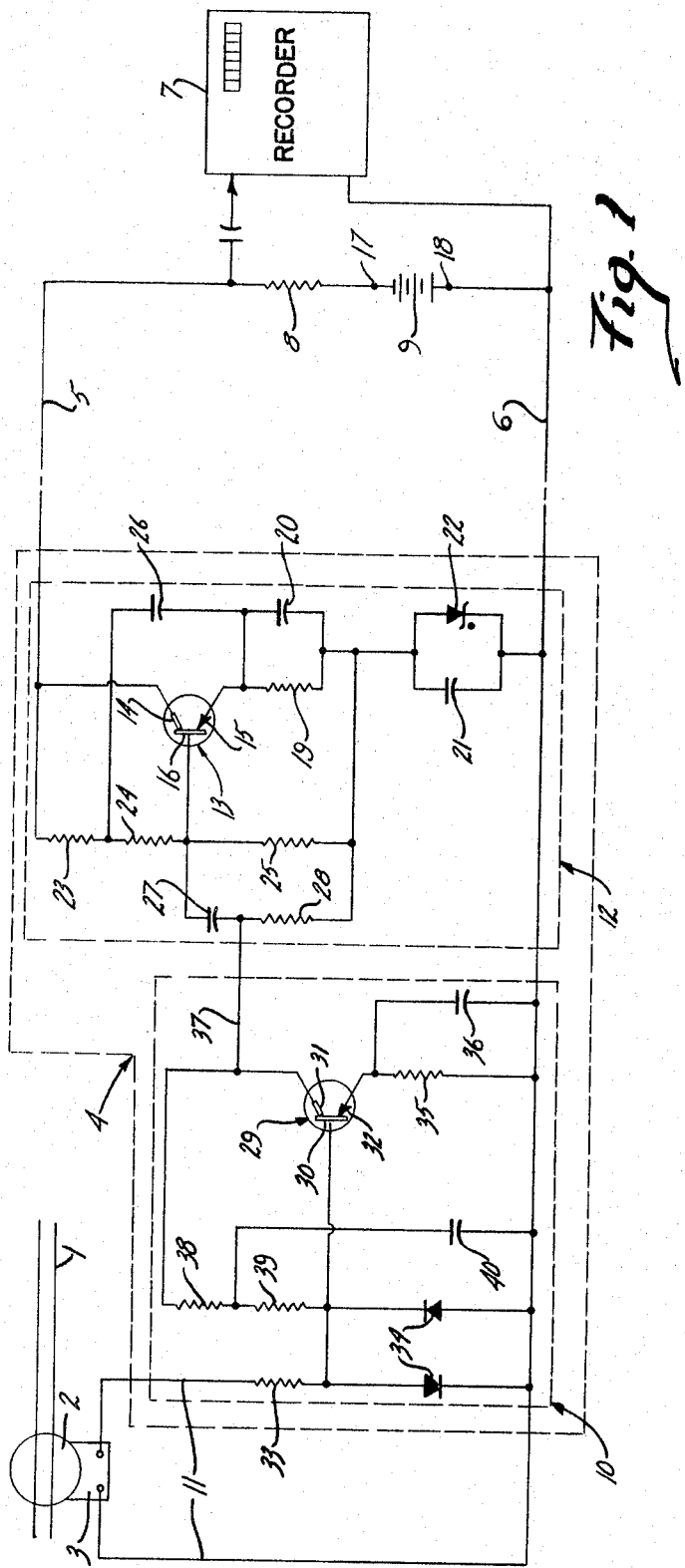
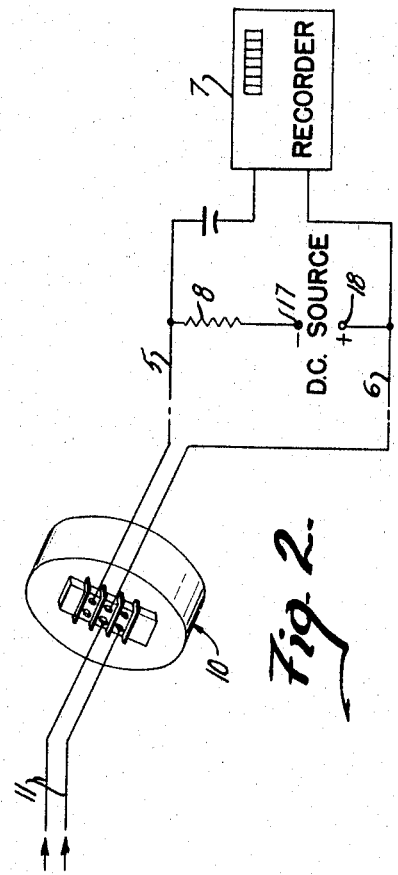
INVENTOR.
TIM H HOULE
BY
*Andrus & Starke*
Attorneys

United States Patent Office 3,319,255
Patented May 9, 1967

3,319,255
SIGNAL TRANSMITTING CIRCUIT FOR REMOTE SENSING OF PETROLEUM FLOW
Tim H. Houle, Wauwatosa, Wis., assignor to A. O. Smith Corporation, Milwaukee, Wis., a corporation of New York
Filed Dec. 28, 1964, Ser. No. 421,257
7 Claims. (Cl. 346—43)

This invention relates to a signal transmission and amplifying circuit and particularly to such a petroleum dispensing system employing such circuits to transmit a low voltage signal to a remotely located recorder or the like.

Recent inventory and dispensing systems provide automatic recording of the product being dispensed. For example, bulk loading plants for petroleum products wherein substantial quantities of a gasoline, kerosene and other petroleum products are stored normally provide automatic metering of the amount of product dispensed. It is highly desirable in certain applications to provide for transmission of signals proportional to the amount of product being dispensed to a remote recorder, control or other similar device. Although electrical transmission systems have been widely developed, there have been certain complications involved in the transmission of a low voltage signal which can be safely employed within the dispensing area of petroleum products with the attendant explosive atmosphere.

In petroleum distribution centers, turbine meters provide accurate metering with the output proportional to the volumetric flow through the dispensing lines. In addition to actuating a mechanical recording device, A.C. generators may be coupled to the turbine meters to provide an A.C. output proportional to the speed of the turbine meter and therefore the volumetric flow through the line. In order to obtain accurate recording of the volumetric flow, compensation must generally be made for the fact that the rise time of the generator although constant for any given speed varies with speed.

The present invention is particularly directed to a pulse forming and transmitting means for transmitting a very small, low voltage signal to a remotely located load in the form of a pulse signal with the transmission independent of the rise time of the signal source.

In accordance with the present invention, a pulse amplifier is formed as a small module which may be mounted at the turbine meter and in fact may be formed as an integrated part thereof. The amplifier includes two stages of amplification with the first stage deriving its operating bias or power through the second or the output power stage. The latter stage includes a charge storage means which will maintain an operating bias on the first circuit or the first amplifying stage whenever the second amplifying stage is cut off. A pair of transmission lines connects the amplifying unit to a remotely located control or recording device. Additionally, the load impedance for the last stage is connected in circuit with the power source at the remote location such that the two wires constitute common signal transmission and power transmission lines and thereby minimize the wiring.

In accordance with a preferred construction of the present invention, a pair of transistor amplifying stages is employed with the output stage biased to a normally conducting condition. A capacitor in parallel with a Zener type diode is connected in the output circuit of the transistor such that the capacitor is charged to a predetermined operating voltage level whenever an output current is flowing in the output circuit. When the output stage is cut off and thus effectively opens the circuit from the power source, the capacitor maintains a power source to the first amplifying stage biasing it for operation. In this construction of the present invention, the output stage must therefore be constructed to be initially conducting and the discharge circuit must be selected such that its resistance or impedance is substantially larger than the load resistance. The time that the output stage can be cut off is limited by the time constant of the discharge of the capacitor circuit. Thus, if at any time this time constant is exceeded, the bias source of the bias provided by the capacitor would disappear and the first amplifying stage would not operate to transmit the signal to the second stage.

This system has been found to provide a highly satisfactory means of transmitting low voltage signals to a remote location with a minimum number of wires and reduced complexity while providing sufficient amplification of the signal for transmission over the transmission lines.

The drawing furnished herewith illustrates a preferred construction of the present invention in which the above advantages and features are clearly set forth as well as others which will be clear from the following description.

In the drawing:

FIG. 1 is a schematic circuit diagram of the present invention incorporated in a flow recording system for a petroleum bulk loading plant or the like; and FIG. 2 is an elevational view of an actual module which has been constructed incorporating the amplifying circuit of the present invention.

Referring to the drawing and particularly to FIG. 1, a flow line 1 is illustrated having its one end connected to a suitable source of a petroleum product; for example, a gasoline bulk storage tank, not shown, and the opposite end connected to a suitable dispensing nozzle or the like. A turbine flow meter 2 is mounted within the flow line 1 in the dispensing area and generates an output proportional to the volumetric flow through the line 1. The meter 2 may be provided with a direct recorder to provide a visual indication at the discharge station of the amount of fluid being discharged. Additionally, a small alternating current (A.C.) generator 3 is secured to the turbine meter 2 and provides an alternating current signal to a pulse amplifier 4, schematically shown in FIG. 1. The amplifier 4 is mounted adjacent the meter and a pair of transmission lines 5 and 6 interconnects the output of the amplifier to a remotely located load, which may be a suitable recorder 7 or other form of a control. A load resistor 8 in series with a power source shown as a battery 9 is connected between the lines 5 and 6 at the remote location with the polarity selected for properly biasing the amplifier 4 for operation as hereinafter described. The load resistor 8 and power source 9 are provided at the remote point such that lines 5 and 6 not only serve as signal transmission lines but further constitute power transmission lines for transmitting power to the amplifier and thus minimizes wiring.

The illustrated amplifier includes a first signal amplifying stage 10 connected by suitable input signal lines 11 to the turbine meter generator 3. A power stage 12 is connected to the output of the first stage and to the transmission lines 5 and 6 to transmit the amplified signal as a pulse signal and to also derive power for operating the amplifier from the battery 9. The power stage 12 as more fully developed hereinafter further includes an interconnecting circuit for transferring power to the first amplifying stage while the power stage 12 is conducting and also provides a power storage source for maintaining power to the first stage for a predetermined time after the power stage 12 is cut off.

The illustrated embodiment of the invention is briefly described before a more particular description is made of the several components, as follows. The power stage 12 as hereinafter described is biased to an initially conducting condition. It transfers power to the first stage and simultaneously stores power for subsequent operation.

When the meter signal is received, the first stage conducts and transmits a cutoff signal to the power stage 12 which is rapidly biased to cutoff. During this period, the charge storage system discharges to provide power to the first amplifying stage 10 and thereby holds stage 12 cutoff for the period of the incoming pulse.

More particularly, in the illustrated embodiment of the invention, the power stage 12 includes a transistor 13 connected in a common emitter configuration and including a collector 14, an emitter 15 and a base 16. The collector 14 is connected directly to transmission line 5 and thereby is connected through the load resistor 8 directly to a negative terminal 17 of the battery 9. The emitter 15 is connected to the positive terminal 18 of the battery 9 via the transmission line 6. An emitter-resistor 19 parallel with a capacitor 20 is connected in the emitter line in accordance with conventional self-biasing circuitry. Additionally, a power storage capacitor 21 in parallel with a Zener type diode 22 is connected in the emitter circuit between line 6 and the emitter bias resistor 19. When the transistor 13 conducts in the output circuit, the capacitor 21 is therefore charged to a level determined by the voltage of the Zener diode 22 and as hereinafter described provides a corresponding voltage to the first stage 10.

The transistor 13 is initially biased to conduct through a bias circuit which includes three resistors 23, 24 and 25 connected in series between line 5 and the junction between the emitter-resistor 19 and bypass capacitor 21. The base 16 of transistor 13 is connected to the junction of the resistors 24 and 25.

A stabilizing capacitor 26 is connected between the junction of resistors 23 and 24 and the emitter 15 of transistor 13.

Initially, the transistor 13 will be biased to conduct as a result of the voltage of the battery 9 which is applied across the collector and emitter junction in the reverse direction and across the base-emitter junction in the forward direction. During this period, the capacitor 21 charges to the value determined by the Zener diode and establishes a cutoff bias to the transistor 13. The capacitor 21 will then provide a voltage source to the first amplifying stage as presently described.

The output of the first stage 10 is connected to the base 16 of the transistor 13 by a coupling capacitor 27 and to the capacitor 21 in parallel with Zener diode 22 by coupling resistor 28. The first stage 10 includes a transistor 29 connected in a common emitter configuration similar to that of transistor 13. Thus, transistor 29 includes a base 30, a collector 31 and an emitter 32. The base 30 is connected to the signal lines 11 from generator 3 through the usual limiter network including a coupling resistor 33 and a pair of oppositely polarized diodes 34 connecting the input of the transistor to the common line 6. Thus, the A.C. signal from the generator is applied between the base 30 and common line 6 which in turn is connected to the emitter through an emitter-resistor 35 and a capacitor 36. The collector 31 is connected by a lead 37 to the junction of the coupling capacitor 27 and the coupling resistor 28. A pair of bias resistors 38 and 39 is connected in series between the lead 37 and the base 30 with a stabilizing capacitor 40 connected between the junction of the resistors 38 and 39 and the common return line 6.

Thus, the first power stage 10 and particularly the transistor 29 has its input bias circuit connected between line 37 and the common line 6 and thus directly across the series-parallel connection of resistor 28 and the paralleled capacitor 21 and Zener diode 22. When the transistor 13 cuts off, the capacitor 21 will discharge through the bias circuit for the transistor 29 and the coupling resistor 28 with the time constant particularly determined by the values resistor 28 and the capacitor 21.

The circuit operation may be briefly described as follows.

The transistor 13 is initially conducting as a result of the bias circuit connected to the battery 9 and rapidly charges capacitor 21. Transistor 13 will continue to conduct until an appropriate cutoff signal is applied to its base 16.

The flow line 1 drives the meter 2 in accordance with the volumetric flow. The meter 2 in accordance with known construction drives the generator 3 to produce an alternating current output signal directly proportional to the volumetric flow and which is applied as the input signal to the amplifier stage 10. When the signal is positive with respect to line 6, transistor 29 is biased to conduct and transmits an amplified signal to the base 16 of transistor 13 which is then cut off. This opens the power supply circuit from the battery 9. Transistor 29 however derives operating power from capacitor 21 which discharges through resistor 28 and transistor 29 for the period determined by the values of resistor 28 and capacitor 21. Generally, the time period will be greater than the period of one half cycle of the signal at the minimum frequency output of generator 3 such that transistor 29 will properly conduct for the appropriate half cycle of the signal. The transistor 29 ceases to conduct upon reversal of the input signal and transistor 13 immediately again begins to conduct and thus effectively pulses the load 7. Capacitor 21 is again rapidly charged to store energy for use during the subsequent period when the transistor 13 is cut off by the appropriate signal from generator 3.

As diagrammatically shown in FIG. 2, an important advantage of the present invention is that it can be made as a small module and mounted directly within a meter and generator unit 42.

An encapsulated unit has been constructed and satisfactorily employed in a petroleum bulk plant to accurately record the quantity of the products being dispensed. A highly important characteristic of this unit is the flatness of the frequency responsive curve over a wide range of frequencies. It has been found that an essentially constant output level can be obtained with the frequency varying from 20 to 50,000 cycles per second. The present invention thus provides an exceptionally satisfactory unit for metering applications where the flow rate may vary substantially from delivery to delivery as well as during any one delivery.

The present invention thus provides a small amplifying system particularly adapted for petroleum product dispensing recording systems and the like.

Various modes of carrying out the invention are contemplated as being within the scope of the following claims particularly pointing out and distinctly claiming the subject matter which is regarded as the invention.

I claim:

1. In a petroleum product measuring system having a turbine meter for recording the volumetric flow and an alternating current signal generator coupled to and driven by the meter, the improvement of a remote recording and transmission system comprising, a remote pulse recording means at a remote location with respect to the meter, a two stage amplifying module for mounting at the meter and having an input stage with an input means connected to the generator and an output stage having an input means and an output means with an energy storage means in the output means connected to supply bias power to the input stage when the output stage is cut off, a single pair of signal and power transmission lines connected to the input means of the output stage and to the output means of the module and to the recording means to supply bias power to the output stage, and power means at the remote location connected across said lines to transmit operating power to the amplifying module.

2. A transmission system comprising, a two stage amplifier having an input stage connected to an output stage, each of said stages including an input means and an output means, an energy storage means connected in the output means of the output stage and connected to supply operating power to the input stage when the output stage is cut off, and power transmission lines connected to the output stage, wherein
said storage means includes a capacitive means charged by conduction of the output stage and connected to discharge through said input stage and wherein said output stage is normally conducting and said input stage is normally cut off.

3. A pulse transmission system comprising,
a first amplifier having an input means connected to a signal source means and an output means,
a second amplifier having an input means connected to said output means and having output means,
power storage means connected in circuit with the output means of said second amplifier to be charged and in circuit with the output means of said first amplifier to provide a bias current to said first amplifier,
transmission lines coupled to said output means of said second amplifier, and
a power source means and load means connected to the end of the transmission line remote from the second amplifier.

4. A pulse transmission system comprising,
a first amplifier stage having an input means connected to a signal source means and an output means and having a bias circuit to hold the stage normally cut off,
a second amplifier stage having an input means connected to said output means and having output means and having a bias circuit to hold the corresponding stage normally conducting,
a capacitive means connected in circuit with the output means of said second amplifier to be charged and in circuit with the output means of said first amplifier to provide a bias current to said first amplifier,
a voltage regulating device connected across said capacitive means,
transmission lines coupled to said output means of said second amplifier, and
a power source means and load means connected to the end of the transmission line remote from the second amplifier stage.

5. A pulse transmission system comprising,
an alternating current input signal means,
a first amplifying stage having input terminal means and output terminal means and having bias means to receive operating power from across the output means,
a second amplifying stage having input terminal means and output terminal means and having operating bias means interconnected to receive operating power from across the output means of the second amplifying stage,
a pair of power lines connected to the output means of the second stage,
a charge storage means,
a voltage regulating element connected in parallel with the storage means to limit the charge therein and to form a bias source connected in series with the output line, and
a coupling impedance connecting said storage means to the output terminal means of the first amplifying stage to provide power when said second stage is not conducting.

6. A pulse transmission system comprising,
an alternating current signal source,
a first transistor having input terminal means and output terminal means and having bias means interconnecting the elements of the transistor to receive operating power from across the output means,
a second transistor having input terminal means and output terminal means and having bias means interconnecting the elements of the transistor to receive operating power from across its output means,
a power source,
a load resistor,
a pair of transmission lines connected at one end to the output means of the second transistor and at the opposite end to the power source in series with the load resistor,
a charge storage capacitor,
a Zener diode connected in parallel with the capacitor to form a bias source connected in series with the output line, and
a coupling resistor connected in series with said bias source and in parallel with the output means of the first transistor to supply operating bias power thereto, said storage capacitor providing power when said second transistor is not conducting.

7. A petroleum product measuring system, comprising
a turbine meter adapted to be driven by a flowing liquid and having an alternating current signal generator coupled thereto.
a first transistor having input terminal means and output terminal means and having bias means interconnecting the elements of the transistor to receive operating power from across the output means and to bias the transistor to be cut off,
a second transistor having input terminal means and output terminal means and having bias means interconnecting the elements of the second transistor to receive operating power from across its output means and to bias the second transistor to conduct,
disc-like means encapsulating said transistors and mounted within the meter,
a load resistor,
a pair of low voltage signal and power transmission lines connected at one end to the output means of the second transistor and at the opposite end in series with the load resistor,
a charge storage capacitor,
a Zener diode connected in parallel with the capacitor to form a bias source connected in series with the output line of the second transistor, and
a coupling resistor connected between the capacitor and the output means of the first transistor to supply operating bias power to the first transistor, said storage capacitor providing power when said second transistor is not conducting.

References Cited by the Examiner

UNITED STATES PATENTS

| | | | |
|---|---|---|---|
| 2,767,582 | 10/1956 | Bartelink | 73—231 |
| 2,974,525 | 3/1961 | Cole | 73—231 |
| 2,983,907 | 5/1961 | Scourtes | 73—231 |
| 3,040,265 | 6/1962 | Forge | 330—24 |
| 3,175,152 | 3/1965 | Shafer | 73—231 |
| 3,177,711 | 4/1965 | Ham et al. | 73—231 |

OTHER REFERENCES

Kiver: Transistors in Radio and Television, 1956, pp. 292–293.

RICHARD B. WILKINSON, *Primary Examiner.*

J. G. MURRAY, H. B. KATZ, *Assistant Examiners.*